(12) United States Patent
Aramoto

(10) Patent No.: US 11,555,534 B2
(45) Date of Patent: Jan. 17, 2023

(54) BALL SCREW DEVICE

(71) Applicant: JTEKT CORPORATION, Osaka (JP)

(72) Inventor: Gento Aramoto, Osaka (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 17/203,065

(22) Filed: Mar. 16, 2021

(65) Prior Publication Data
US 2021/0301909 A1   Sep. 30, 2021

(30) Foreign Application Priority Data

Mar. 26, 2020  (JP) .............................. JP2020-056298

(51) Int. Cl.
*F16H 25/22*   (2006.01)
*F16D 125/40*   (2012.01)

(52) U.S. Cl.
CPC ..... *F16H 25/2204* (2013.01); *F16H 25/2233* (2013.01); *F16D 2125/40* (2013.01)

(58) Field of Classification Search
CPC ...... F16H 25/20; F16H 25/22; F16H 25/2204; F16H 25/2214; F16H 25/24; F16H 2025/2081; F16D 2125/40
See application file for complete search history.

(56) References Cited

U.S. PATENT DOCUMENTS

| 9,863,514 | B2 * | 1/2018 | Tashiro | ................... F16D 65/18 |
| 10,247,286 | B2 * | 4/2019 | Tashiro | ............... F16H 25/2238 |
| 10,352,418 | B2 * | 7/2019 | Aramoto | ............. F16H 25/2233 |
| 11,047,459 | B2 * | 6/2021 | Tashiro | ............... F16H 25/2233 |
| 2011/0162935 | A1 * | 7/2011 | Winkler | ............... F16H 25/2238 |
| | | | | 192/219.4 |
| 2016/0033018 | A1 | 2/2016 | Tashiro | |
| 2016/0186825 | A1 * | 6/2016 | Winkler | ................ B60T 13/741 |
| | | | | 188/106 F |
| 2018/0283511 | A1 * | 10/2018 | Tashiro | .................. F16D 65/183 |
| 2020/0200245 | A1 * | 6/2020 | Zinnecker | ........... F16H 25/2427 |
| 2021/0062899 | A1 * | 3/2021 | Brubaker | ............ F16H 25/2454 |

FOREIGN PATENT DOCUMENTS

| DE | 102014223021 | A1 * | 5/2016 | ............ B60T 13/741 |
| JP | 2016-035289 | A | 3/2016 | |
| JP | 2021162022 | A * | 10/2021 | |

* cited by examiner

*Primary Examiner* — Adam D Rogers
(74) *Attorney, Agent, or Firm* — Oliff PLC

(57) ABSTRACT

A ball screw device includes a screw shaft that has a first helical groove on an outer circumference, a nut that has a second helical groove on an inner circumference, a plurality of balls, a stopper provided at an end portion of the second helical groove, and a spring body that is placed between an end portion ball closest to the stopper and the stopper. The spring body is configured of a plurality of coil springs arrayed along the first helical groove and the second helical groove. The coil springs that are adjacent each have a spring end portion of which rigidity is higher than rigidity of a spring middle portion.

6 Claims, 9 Drawing Sheets

BALL SCREW DEVICE

CROSS-REFERENCE TO RELATED APPLICATION

This application claims priority to Japanese Patent Application No. 2020-056298 filed on Mar. 26, 2020, incorporated herein by reference in its entirety.

BACKGROUND

1. Technical Field

The disclosure relates to a ball screw device.

2. Description of Related Art

Japanese Unexamined Patent Application Publication No. 2016-35289 (JP 2016-35289 A) discloses a ball screw device that is applicable to a brake device of an automobile. This ball screw device has a screw shaft with a helical groove formed on the outer circumference, a nut with a helical groove formed on the inner circumference, which is provided on the outer circumference side of the screw shaft, and a plurality of balls provided between the helical groove of the screw shaft and the helical groove of the nut. The nut moves along the axial direction of the screw shaft by rotation of the screw shaft. The ball screw device disclosed in JP 2016-35289 A is not a type of device in which the balls circulate when the nut moves, but rather is a non-circulating type device in which the balls roll while being retained in the helical groove of the nut when the nut moves.

SUMMARY

FIG. 9 is an explanatory diagram, in which part of a helical groove of a screw shaft and a helical groove of a nut that a non-circulating type ball screw device has is viewed from an axial direction. A stopper (stopper ball) 92 is provided at an end portion of a helical groove 90a of a nut 90. A coil spring 93 is provided between an end portion ball 99a that is closest to the stopper 92 out of a plurality of balls 99, and the stopper 92.

When the nut 90 moves due to rotation of a screw shaft 94, the balls 99 move in a direction indicated by an arrow J, along a helical groove 94a of the screw shaft 94 and the helical groove 90a of the nut 90. Accordingly, the end portion ball 99a presses the coil spring 93, compressing the coil spring 93. A portion 93a of the coil spring 93 at the end portion ball 99a side is readily compressed, but a portion 93b at the stopper 92 side is not readily compressed. This is because force of the end portion ball 99a pressing the coil spring 93 is less readily conveyed the further toward the stopper 92 side, due to frictional resistance between the coil spring 93 and the helical grooves 90a and 94a.

Accordingly, the coil spring 93 does not exhibit uniform compression deformation as a whole between the end portion ball 99a and the stopper 92, and fatigue progresses at the portion where deformation is great, i.e., at the portion 93a at the end portion ball 99a side. As a result, there is a possibility that the life of the coil spring 93 will be shorter as compared to when exhibiting uniform compression deformation as a whole. Also, realizing compression deformation of the coil spring 93 as a whole enables the movement stroke of the nut 90 to be larger.

Accordingly, the present disclosure provides a ball screw device that can realize compression deformation of a coil spring as a whole between an end portion ball and a stopper.

A ball screw device according to an aspect of the present disclosure includes a screw shaft that has a first helical groove on an outer circumference, a nut that is provided on the outer circumferential side of the screw shaft and that has a second helical groove on an inner circumference, a plurality of balls that are provided between the first helical groove and the second helical groove, a stopper that is provided at an end portion of the second helical groove, and a spring body that is placed between an end portion ball closest to the stopper out of the balls and the stopper. The spring body is configured of a plurality of coil springs arrayed along the first helical groove and the second helical groove.

According to the above ball screw device, the coil springs are separated into a plurality and arrayed in a row between the end portion ball and the stopper. Accordingly, the coil springs can be subjected to compression deformation as a whole between the end portion ball and the stopper by changing the properties of each of the coil springs, for example. As a result, the life of the coil spring can be extended.

In the ball screw device according to the above aspect, the coil springs that are adjacent are in contact with each other, and the coil springs that are adjacent each have a spring end portion of which rigidity is higher than rigidity of a spring middle portion. When the coil springs are separated into a plurality, the spring end portions come into contact with each other. When the forms of the spring end portions are the same as the forms of the spring middle portions, i.e., when the rigidity of the spring end portions is low, there is a possibility that the centers of the spring end portions will become misaligned, for example, in a state where the spring end portions are in contact with each other, leading to unpredictable behavior. In such a case, the functions of the ball screw device will deteriorate. However, according to the ball screw device of the present disclosure, the rigidity of the spring end portions is high. As a result, the orientation and the behavior of the spring end portions that are adjacent can be stabilized.

In the above aspect, the spring end portion may be allowed to become solid when compressed under a load at which the spring middle portion exhibits elastic compression deformation, due to a pitch at the spring end portion being narrower than a pitch at the spring middle portion. In this case, when the coil springs are compressed, the spring middle portions exhibit elastic compression deformation, but the spring end portions are allowed to become solid. By the coil springs being compressed and becoming solid at the spring coil portions, the rigidity of the spring end portions is higher than the rigidity of the spring middle portions.

Alternatively, in the above aspect, the spring end portion may be in a solid state. According to this configuration, the rigidity of the spring end portions is higher than the rigidity of the spring middle portions.

Alternatively, in the above aspect, a spring constant of the spring end portion may be high, due to a pitch at the spring end portion being wider than a pitch at the spring middle portion. In a coil spring, broadening the pitch of the coiled wire and reducing the number of coils raises the spring constant, and thus the rigidity of the spring end portions is higher than the rigidity of the spring middle portions, according to the above configuration. Also, in the case of this configuration, the spring end portions can also exhibit elastic compression deformation, and accordingly the effective length of the spring body configured of the coil springs placed between the end portion ball and the stopper is longer. Thus, the movement stroke of the nut can be made to be even larger.

Also, in the above aspect, a total dimension in a spring longitudinal direction of two of the spring end portions that are adjacent may be smaller than a coil average diameter of the coil springs. In an arrangement in which a spacer ball is interposed between the coil springs, the diameter of the spacer ball is approximately the same as the coil average diameter of the coil springs. Thus, according to the above configuration, the spring end portions are short, and the effective length of the coil springs can be made to be longer as compared to when employing the spacer ball.

When the nut moves along an axial direction of the screw shaft due to rotation of the screw shaft, the balls also move along the first helical groove and the second helical groove. The coil springs compressed by the movement of the end portion ball included in the balls are readily compressed at the end portion ball side, but not readily compressed at the stopper side. Accordingly, in the above aspect, in the coil springs placed between the end portion ball and the stopper, a spring constant of a coil spring at the stopper side may be smaller than a spring constant of a coil spring at the end portion ball side. According to the above configuration, the coil spring at the stopper side is readily made to exhibit compression deformation. Accordingly, the spring body configured of the coil springs can be readily made to exhibit compression deformation as a whole. As a result, the movement stroke of the nut can be increased.

According to the present disclosure, compression deformation of the coil spring as a whole can be realized between the end portion ball and the stopper.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Regarding Brake Device

Figure 1:
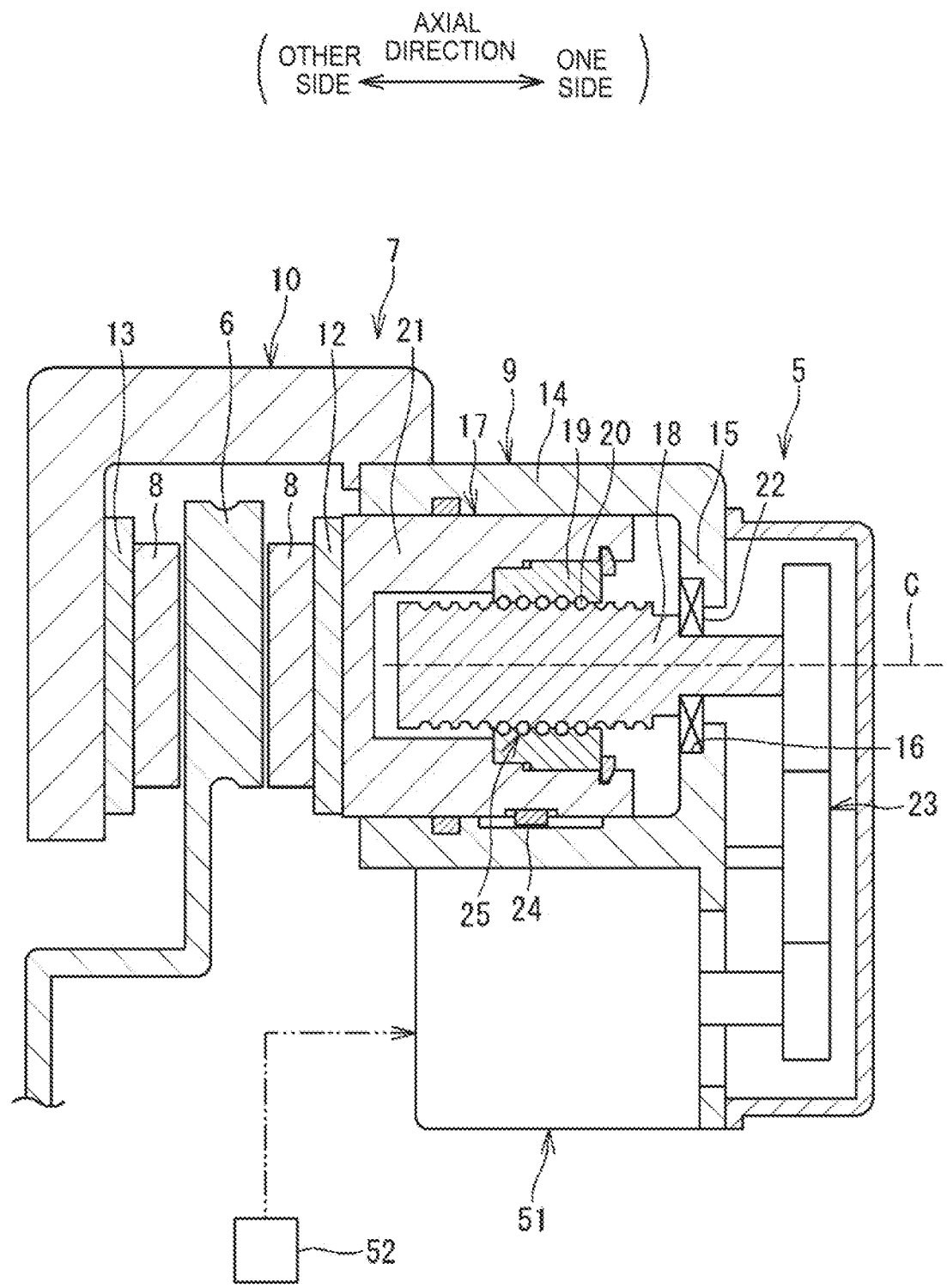
FIG. 1 is a cross-sectional diagram illustrating an example of a brake device provided with a ball screw device.

FIG. 1 is a cross-sectional view illustrating an example of a brake device provided with a ball screw device. The ball screw device 17 illustrated in FIG. 1 is used in a brake device 5 in a vehicle (automobile), for example. The brake device 5 imparts braking force from friction to a disc 6 that integrally rotates with a wheel of the automobile. The brake device 5 is provided with the ball screw device 17 to generate this braking force. The brake device 5 is in a non-braking state in FIG. 1.

The brake device 5 is provided with a floating-type caliper 7 that is supported by an unshown knuckle or the like, and a pair of pads 8 that sandwich the disc 6. The caliper 7 is provided with a first body 9, and a second body 10 provided integrally with the first body 9.

One (to the right side in FIG. 1) pad 8 is attached to a later-described housing 21 that the ball screw device 17 has, via a first backup plate 12. The other (to the left side in FIG. 1) pad 8 is attached to the second body 10 via a second backup plate 13.

The first body 9 has a cylindrical form (a form of a cylinder that has a bottom) including a cylinder main body portion 14 and a bottom plate portion 15, and is opened toward the disc 6 side. The ball screw device 17 is disposed on the inner side of the cylinder main body portion 14. The ball screw device 17 is provided with a screw shaft 18, a nut 19 disposed on the outer circumferential side of the screw shaft 18, and a plurality of balls 20. The housing 21 is attached to the nut 19. A center line C of the screw shaft 18 is the center line of the ball screw device 17. In the present disclosure, a direction parallel to this center line C will be referred to as "axial direction".

A through hole 16 is formed on the bottom plate portion 15 of the first body 9. A bearing 22 is attached to this through hole 16. The screw shaft 18 is rotatably supported by the bearing 22. A key 24 is provided between the housing 21 and the cylinder main body portion 14. The housing 21 is arranged to be capable of reciprocal movement as to the cylinder main body portion 14 in the axial direction, but to be incapable of rotation in a circumferential direction about the center line C.

The nut 19 and the housing 21 are integral. When the screw shaft 18 rotates in one direction about the center line C (forward rotation), the nut 19 and the housing 21 move along the screw shaft 18 from one side (the right side in FIG. 1) in the axial direction toward the other side (the left side in FIG. 1) in the axial direction. Conversely, when the screw shaft 18 rotates in the other direction about the center line C (reverse rotation), the nut 19 and the housing 21 move along the screw shaft 18 from the other side in the axial direction toward the one side in the axial direction.

A motor (electric motor) 51 and a speed reducer 23 are provided outside of the cylinder main body portion 14. Command signals from a control unit 52 are input to the motor 51, and an output shaft of the motor 51 performs forward rotation, reverse rotation and stopping, based on these command signals. The speed reducer 23 is configured of a plurality of gears, for example, and reduces the rotations from the output shaft of the motor 51 and rotates the screw shaft 18. Accordingly, when the motor 51 rotates, the nut 19 and the housing 21 move in the axial direction. That is to say, the rotating motion of the screw shaft 18 transmitted from the motor 51 via the speed reducer 23 is converted to linear motion of the nut 19 and the housing 21 in the axial direction by the ball screw device 17. Thus, the pads 8 squeeze the disc 6, thereby generating braking force.

Figure 2:
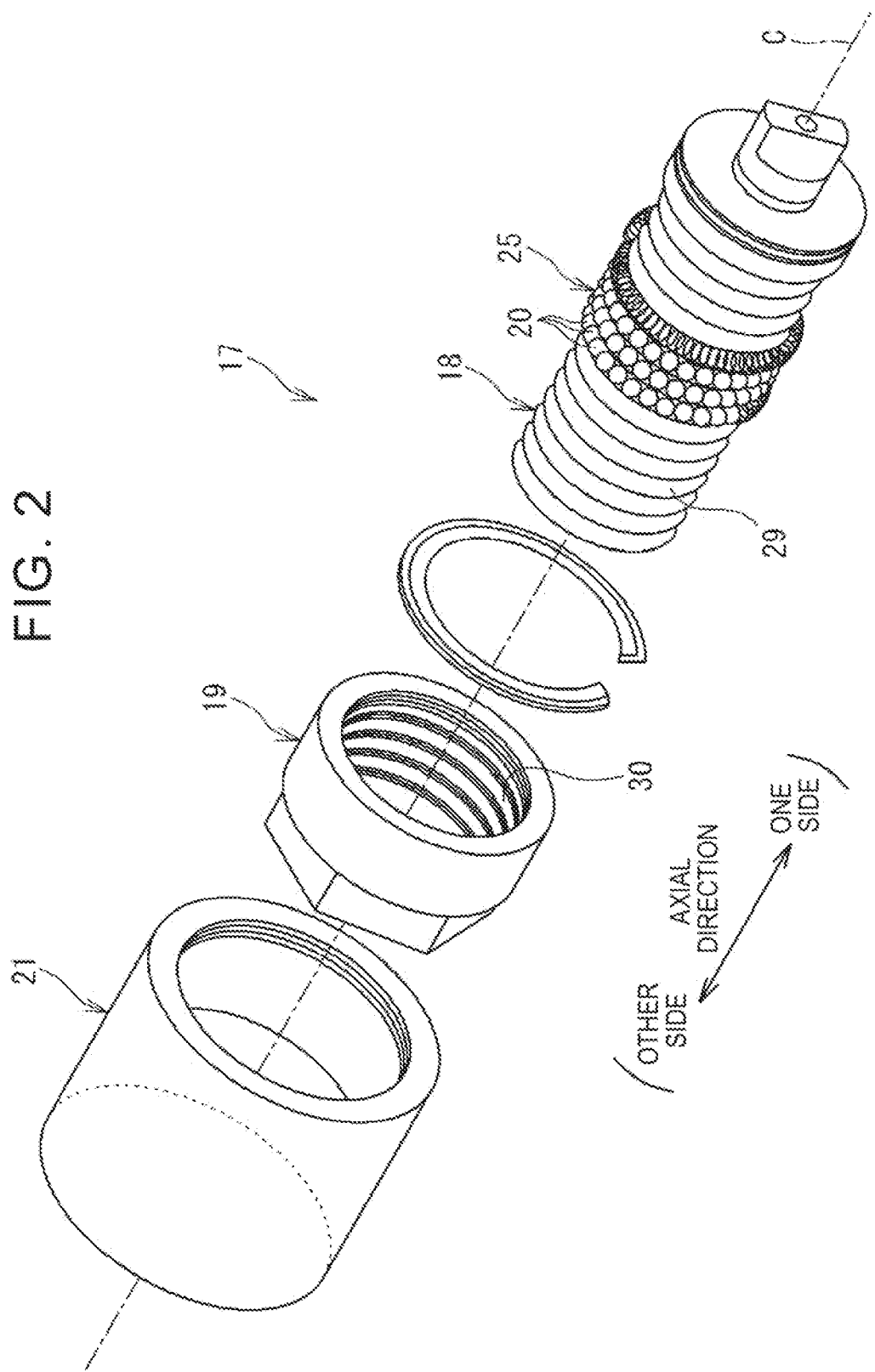
FIG. 2 is a disassembled perspective view of the ball screw device.
Figure 3:
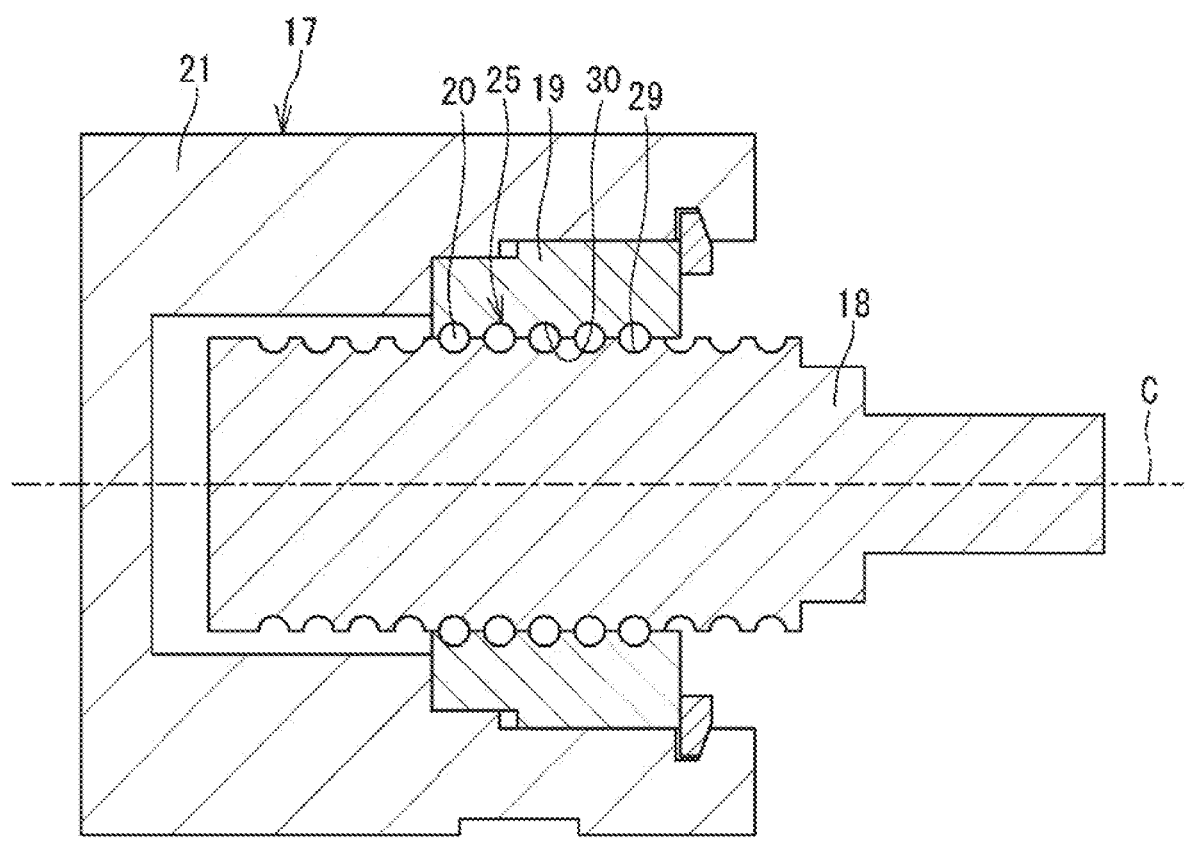
FIG. 3 is a sectional view of the ball screw device.

FIG. 2 is a disassembled perspective view of the ball screw device 17. FIG. 3 is a sectional view of the ball screw device 17. A first helical groove 29 is formed on the outer circumference of the screw shaft 18. A second helical groove 30 is formed on the inner circumference of the nut 19. A ball row 25 configured of the balls 20 is provided between the first helical groove 29 and the second helical groove 30.

Figure 4:
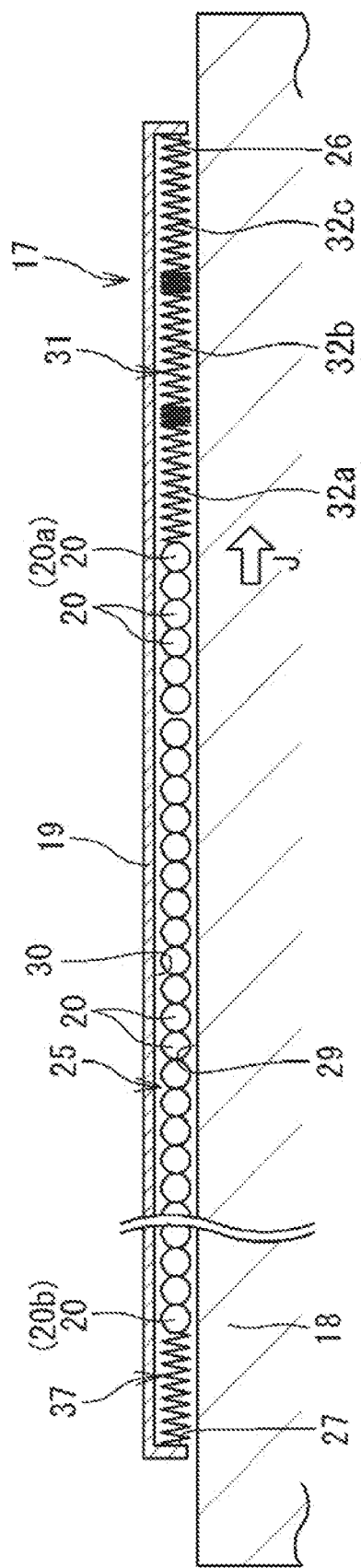
FIG. 4 is an explanatory diagram illustrating a first helical groove and a second helical groove in a state opened up on a plane.

FIG. 4 is an explanatory diagram illustrating the first helical groove 29 and the second helical groove 30 in a state opened up on a plane. All balls 20 (ball row 25) are in a state accommodated at the inner circumferential side of the nut 19. The ball screw device 17 further is provided with stoppers 26 and 27 that are provided at respective end portions of the second helical groove 30. The stoppers 26 and 27 are provided on respective sides in the axial direction, on the inner circumferential side (second helical groove 30) of the nut 19. A first stopper 26 on one side is configured of a wall portion at the end of the second helical groove 30 on one side. The wall portion is a part of the nut 19. A second stopper 27 on the other side is configured of a wall portion at the end of the second helical groove 30 on the other side. Note that one or both of the first stopper 26 and the second stopper 27 may be configured of a ball provided to the nut 19 in an immovable manner, or of a pin member fixed to the nut 19, for example.

Of the balls 20 included in the ball row 25, the ball 20 closest to the first stopper 26, i.e., the ball 20 at the rightmost side in FIG. 4 will be referred to as "first end portion ball 20a". A first spring body 31 configured of a coil spring is provided between the first end portion ball 20a and the first stopper 26. The first spring body 31 is in a compressed state.

Of the balls 20 included in the ball row 25, the ball 20 closest to the second stopper 27, i.e., the ball 20 at the leftmost side in FIG. 4 will be referred to as "second end portion ball 20b". A second spring body 37 configured of a coil spring is provided between the second end portion ball 20b and the second stopper 27. The second spring body 37 is in a compressed state.

The ball screw device 17 that has the above configuration is a non-circulating ball screw device in which the balls 20 roll while being retained within the second helical groove 30 when the nut 19 moves along the axial direction of the screw shaft 18. The nut 19 moves over a predetermined stroke from a state at an initial position. When the nut 19 moves from the initial position, the direction of movement of the ball row 25 is a direction toward the first stopper 26. That is to say, when the nut 19 moves from the initial position, the direction of movement of the ball row 25 is in a direction by which the first spring body 31 is further compressed.

Figure 5:
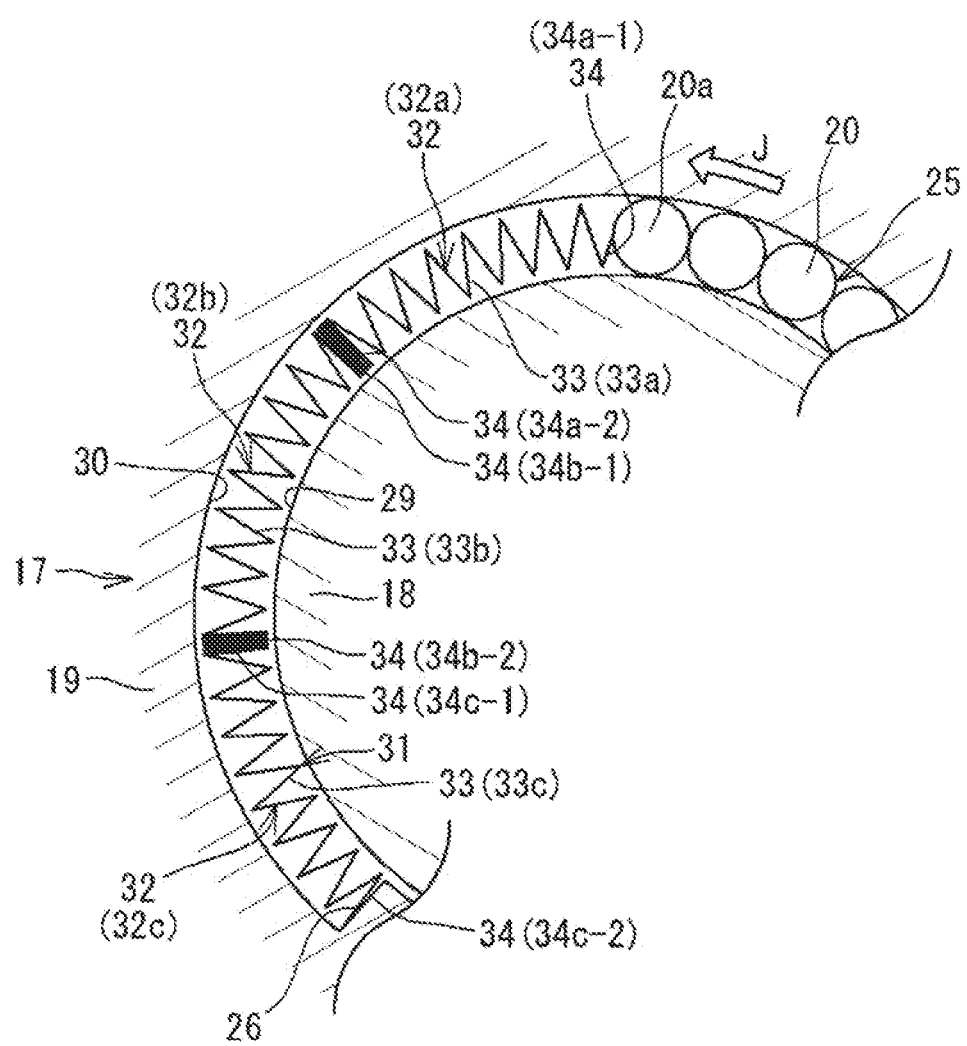
FIG. 5 is an explanatory diagram, in which a first spring body is viewed from an axial direction of the ball screw device.

FIG. 5 is an explanatory diagram in which the first spring body 31 is viewed from the axial direction of the ball screw device 17. The first spring body 31 is provided between the first end portion ball 20a and the first stopper 26, as mentioned earlier. The first spring body 31 includes a plurality of coil springs 32. The coil springs 32 are arrayed serially along the first helical groove 29 and the second helical groove 30. Adjacent coil springs 32 are in direct contact with each other at the end portions thereof. In the present disclosure, three coil springs 32a, 32b, and 32c are included in the first spring body 31. Note that the number of coil springs 32 included in the first spring body 31 can be freely changed in accordance with the model number of the ball screw device 17 and so forth.

The coil springs 32 each have a middle portion, and end portions on both sides of the middle portion. In the present disclosure, the middle portion is referred to as "spring middle portion 33", and the end portions are referred to as "spring end portion 34". The spring end portions 34 of adjacent coil springs 32 are in a state of being in contact with each other. In the case of the present disclosure, a spring end portion 34a-2 of the first coil spring 32a and one spring end portion 34b-1 of the second coil spring 32b are in a state of being in contact, and the other spring end portion 34b-2 of the second coil spring 32b and a spring end portion 34c-1 of the third coil spring 32c are in a state of being in contact.

In the first spring body 31, the properties (spring constants) of the coil springs 32a, 32b, and 32c are each different. The third coil spring 32c at the first stopper 26 side has a smaller spring constant than the second coil spring 32b, and the second coil spring 32b has a smaller spring constant than the first coil spring 32a at the end portion ball 20a side. Note that the spring constant described here is the value at the spring middle portion 33. That is to say, in the first spring body 31, the spring constant of the spring middle portion 33 of the coil spring 32 at the first stopper 26 side is smaller than that of the spring middle portion 33 of the coil spring 32 at the end portion ball 20a side. Note that the coil average diameter D (see FIG. 6) is the same for each of the coil springs 32a, 32b, and 32c. The diameter of the wire (coiled wire) of the coil springs 32a, 32b, and 32c may be the same or may be different. The length of each of the coil springs 32a, 32b, and 32c may be the same or may be different.

Figure 6:
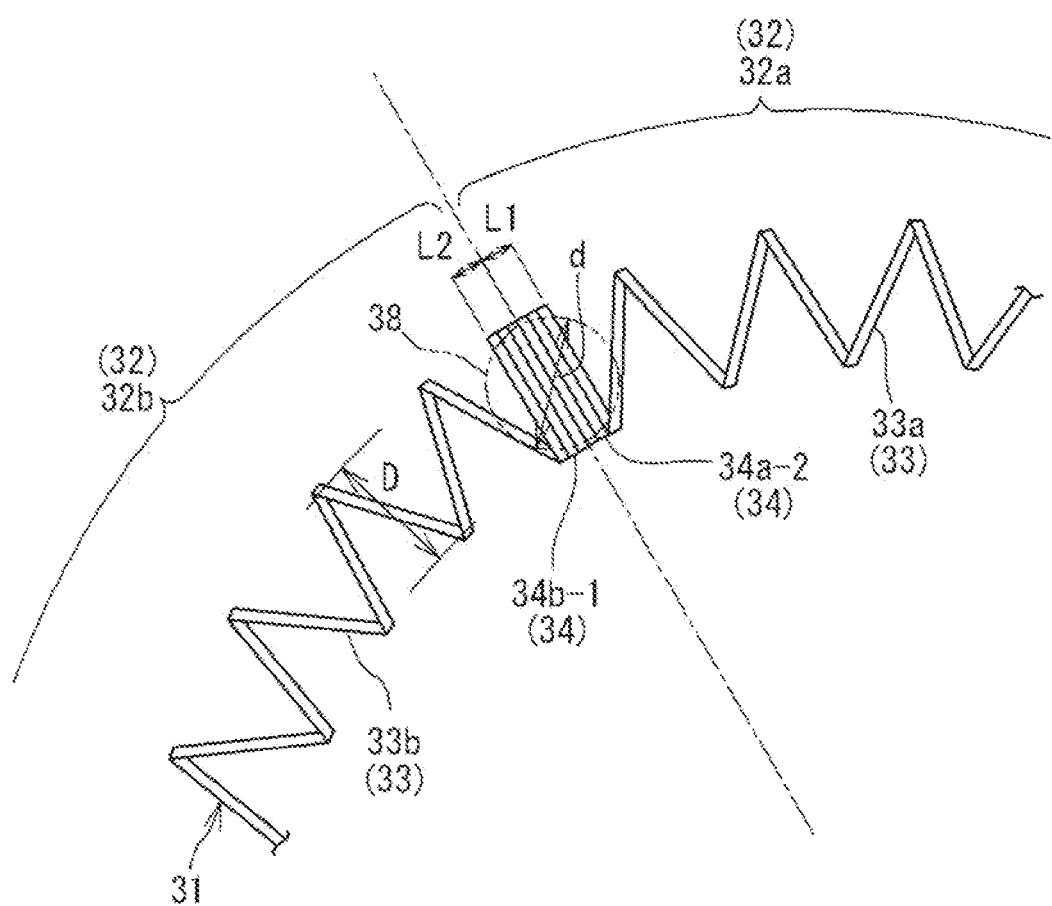
FIG. 6 is an explanatory diagram of spring end portions of adjacent coil springs (first arrangement)

Description will be made regarding the first coil spring 32a that comes into direct contact with the end portion ball 20a. One spring end portion 34a-1 of the first coil spring 32a is in contact with the end portion ball 20a. The spring end portion 34a-1 has the same properties (the same rigidity) as a spring middle portion 33a. The other spring end portion 34a-2 of the first coil spring 32a has a configuration where the rigidity thereof is higher than the spring middle portion 33a of the first coil spring 32a. In the present disclosure, the spring end portion 34a-2 is solid, as illustrated in FIG. 6. That is to say, the spacing between the coiled wires configuring the coil spring 32a is zero at the spring end portion 34a-2. Note that other configurations may be made to raise the rigidity, which will be described later. The boundary between the first coil spring 32a and the second coil spring 32b is indicated by a long dashed short dashed line in FIG. 6.

Description will be made regarding the second coil spring 32b adjacent to the first coil spring 32a. One spring end portion 34b-1 of the second coil spring 32b is in contact with the spring end portion 34a-2 of the first coil spring 32a. The one spring end portion 34b-1 of the second coil spring 32b has a configuration where the rigidity thereof is higher than that of the spring middle portion 33b of the second coil spring 32b. In the present disclosure, the spring end portion 34b-1 is solid, as illustrated in FIG. 6. The other spring end portion 34b-2 of the second coil spring 32b (see FIG. 5) is in contact with the spring end portion 34c-1 of the third coil spring 32c. The other spring end portion 34b-2 of the second coil spring 32b has a configuration where the rigidity thereof is higher than that of the spring middle portion 33b of the second coil spring 32b. In the present disclosure, the spring end portion 34b-2 is solid.

Description will be made regarding the third coil spring 32c that comes into direct contact with the first stopper 26. One spring end portion 34c-1 of the third coil spring 32c is in contact with the spring end portion 34b-2 of the second coil spring 32b. The one spring end portion 34c-1 of the third coil spring 32c has a configuration in which the rigidity thereof is higher than that of the spring middle portion 33c of the third coil spring 32c. In the present disclosure, the spring end portion 34c-1 is solid. The other spring end portion 34c-2 of the third coil spring 32c is in contact with the first stopper 26. The spring end portion 34c-2 has the same properties (the same rigidity) as the spring middle portion 33c.

As described above, the first coil spring 32a and the second coil spring 32b that are adjacent each have the spring end portions 34a-2 and 34b-1 that have higher rigidity than the spring middle portions 33a and 33b. The second coil spring 32b and the third coil spring 32c that are adjacent each have the spring end portions 34b-2 and 34c-1 that have higher rigidity than the spring middle portions 33b and 33c.

Configuration for Raising Rigidity of Spring End Portion 34 (First Arrangement)

As described above, the spring end portion 34 is in a solid state, in order to make the rigidity of the spring end portion 34 higher than that of the spring middle portion 33. According to this configuration, the orientation and the behavior of each of the adjacent spring end portions 34 can be stabilized. Further, the wire of the adjacent coil spring 32 is not readily displaced into the spring end portion 34. For example, in FIG. 6, the wire of the spring end portion 34b-1 of the second coil spring 32b which is in contact with the spring end portion 34a-2 of the first coil spring 32a is not readily displaced into the spring end portion 34a-2, since the spring end portion 34a-2 is solid. Also, in the same way, the wire of the spring end portion 34a-2 of the first coil spring 32a which is in contact with the spring end portion 34b-1 of the second coil spring 32b is not readily displaced into the spring end portion 34b-1, since the spring end portion 34b-1 is solid.

As described above, the coil average diameter D of the three coil springs 32 is the same. The one spring end portion 34a-2 and the other spring end portion 34b-1 are in contact. The dimension of the one spring end portion 34a-2 in a spring longitudinal direction is L1, and the dimension of the other spring end portion 34b-1 in the spring longitudinal direction is L2. Note that the spring longitudinal direction is the length in the direction along a center line of the coil spring 32. In the arrangement illustrated in FIG. 6, dimensions L1 and L2 are each dimensions in the spring longitudinal direction of the portions that are solid. The sum of the dimension L1 of the one spring end portion 34a-2 in the spring longitudinal direction and the dimension L2 of the other spring end portion 34b-1 in the spring longitudinal direction (L1+L2) is smaller than the coil average diameter D of the coil springs 32 (L1+L2<D) in the present disclosure.

Also, the spring end portion 34b-2 and the spring end portion 34c-1 of the second coil spring 32b and the third coil spring 32c (see FIG. 5) have the same configuration. That is to say, the sum of the dimension of the one spring end portion 34b-2 in the spring longitudinal direction and the dimension of the other spring end portion 34c-1 in the spring longitudinal direction is smaller than the coil average diameter of the coil springs 32b and 32c.

As described above (see FIG. 6), the total dimension in the spring longitudinal direction of two adjacent spring end portions 34a-2 and 34b-1 (L1+L2) is smaller than the coil average diameter D of the coil springs 32a and 32b (L1+L2<D).

In FIG. 6, supposing that a spacer ball 38 (indicated by long dashed double-short dashed line) is to be interposed between the first coil spring 32a and the second coil spring 32b, the diameter d of the spacer ball 38 will be approximately the same as the coil average diameter D of the coil springs 32a (32b) (d=D). Thus, according to the above-described configuration of L1+L2<D, the spring end portions 34a-2 and 34b-1 are short in the spring longitudinal direction, and the effective length of the coil springs 32a and 32b can be made to be longer as compared to when employing the spacer ball 38. Also, the spacer ball 38 is unnecessary in the ball screw device 17 according to the present disclosure, and the number of parts of the ball screw device 17 can be reduced.

Configuration for Raising Rigidity of Spring End Portion 34 (Second Arrangement)

The spring end portion 34 may be configured as follows in order to make the rigidity of the spring end portion 34 higher than that of the spring middle portion 33. That is to say, by making the pitch at the spring end portion 34a-2 of the first coil spring 32a to be narrower than that at the spring middle portion 33a in FIG. 7 (P2<P1 in FIG. 7), the spring end portion 34a-2 is allowed to become solid when compressed under the load of the spring middle portion 33a exhibiting elastic compression deformation. In the same way, by making the pitch at the spring end portion 34b-1 of the second coil spring 32b to be narrower than that at the spring middle portion 33b, the spring end portion 34b-1 is allowed to become solid when compressed under the load of the spring middle portion 33b exhibiting elastic compression deformation.

Figure 7:
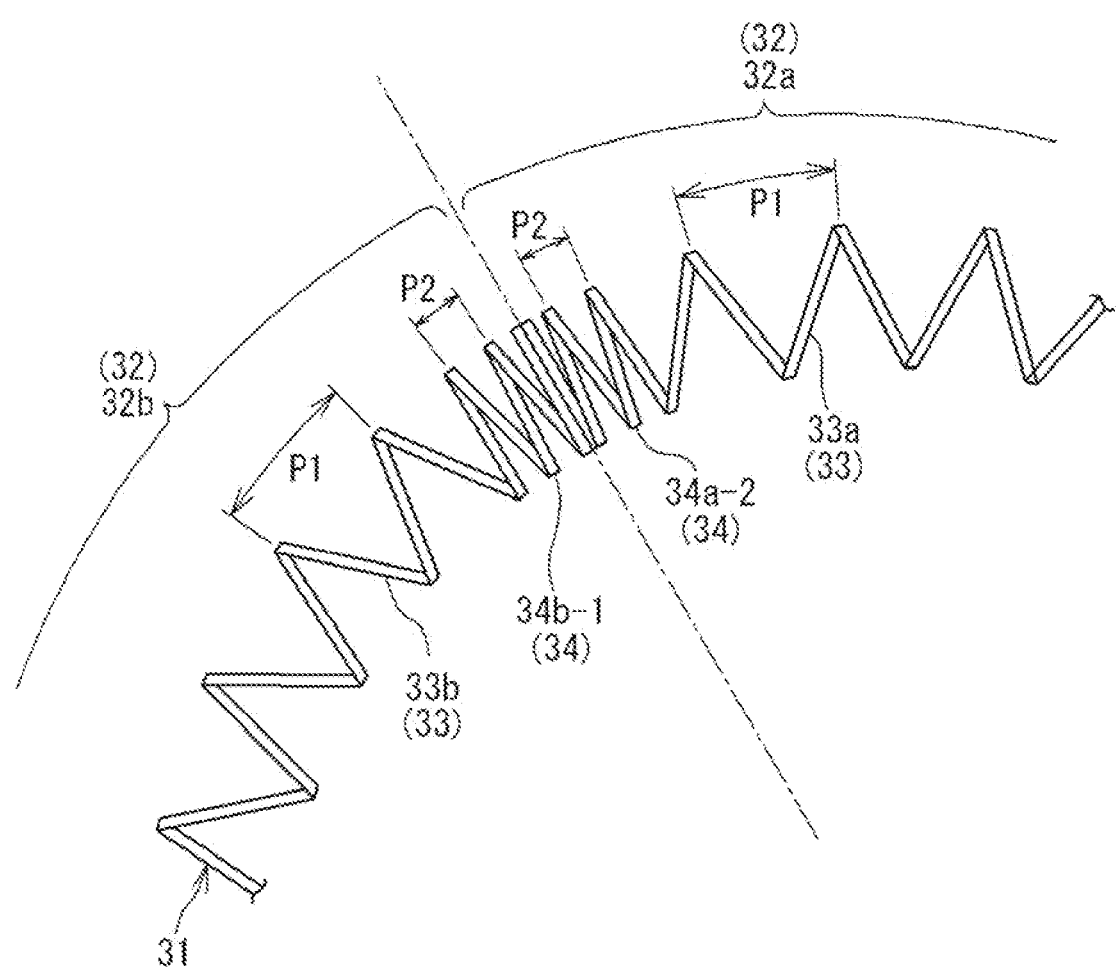
FIG. 7 is an explanatory diagram of spring end portions of adjacent coil springs (second arrangement)

According to the configuration illustrated in FIG. 7, when the coil springs 32a and 32b are compressed, the spring middle portions 33a and 33b exhibit elastic compression deformation, but the spring end portions 34a-2 and 34b-1 are allowed to become solid. By the coil springs 32a and 32b being compressed, and the spring end portions 34a-2 and 34b-1 each becoming solid, the rigidity of each of the spring end portions 34a-2 and 34b-1 becomes higher than that of the spring middle portions 33a and 33b. Accordingly, the orientation and the behavior of each of the adjacent spring end portions 34a-2 and 34b-1 can be stabilized. Also, in the same way as in FIG. 6, the wire of the coil spring 32b (32a) is not readily displaced into the spring end portion 34a-2 (34b-1), since the spring end portion 34a-2 (34b-1) becomes solid.

The spring end portion 34b-2 and the spring end portion 34c-1 that form a contact portion where the second coil spring 32b and the third coil spring 32c come into contact have the same configuration as the configuration illustrated in FIG. 7. Accordingly, the orientation and the behavior of each of the adjacent spring end portions 34b-2 and 34c-1 can be stabilized.

When the two adjacent spring end portions 34a-2 and 34b-1 (34b-2 and 34c-1) become solid, the total dimension in the spring longitudinal direction of these spring end portions 34a-2 and 34b-1 (34b-2 and 34c-1) is preferably smaller than the coil average diameter of the coil springs 32a and 32b in the arrangement in FIG. 7 as well, as in the arrangement in FIG. 6.

Configuration for Raising Rigidity of Spring End Portion 34 (Third Arrangement)

Figure 8:
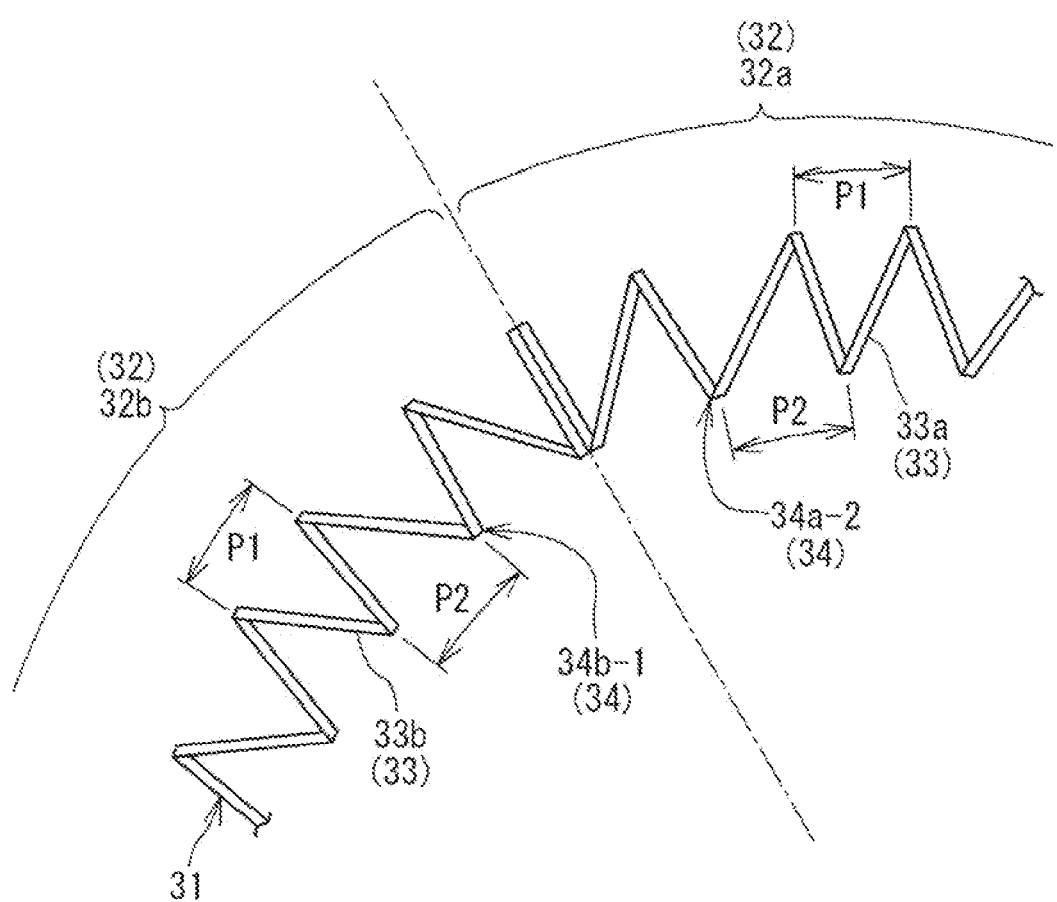
FIG. 8 is an explanatory diagram of spring end portions of adjacent coil springs (third arrangement)
Figure 9:
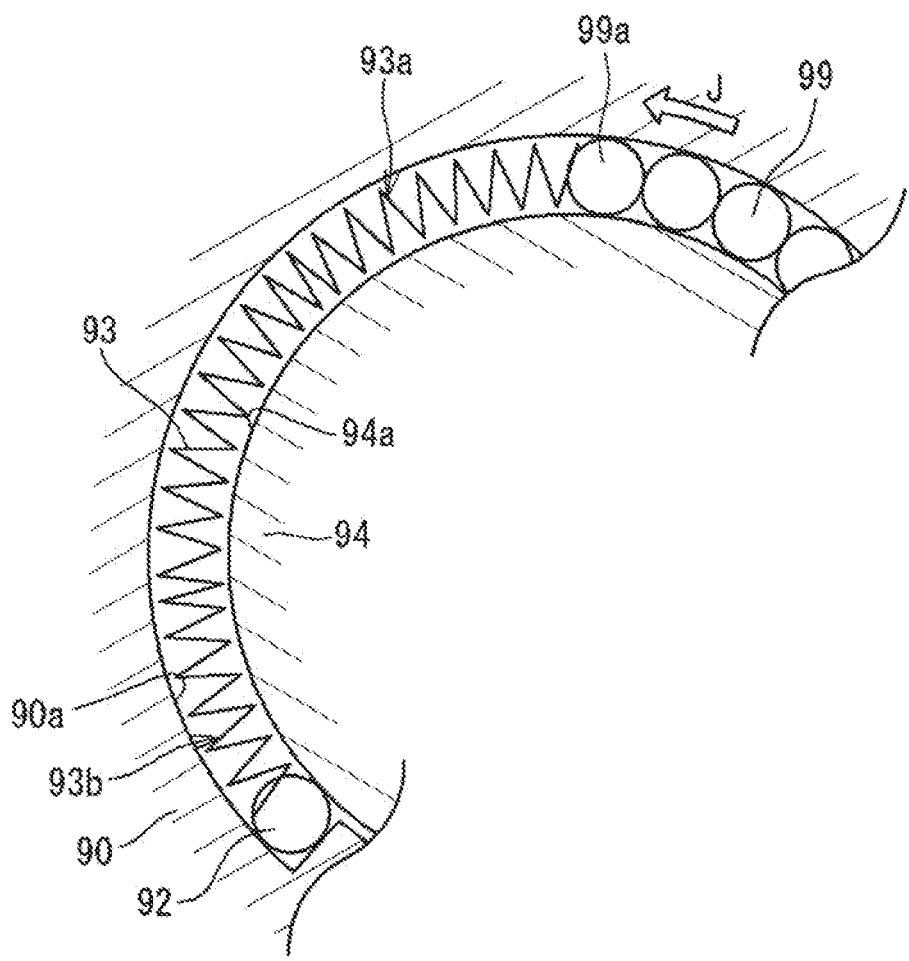
FIG. 9 is an explanatory diagram, in which part of a helical groove of a screw shaft and a helical groove of a nut that a non-circulating type ball screw device has is viewed from an axial direction (related art).

The spring end portion 34 has a high spring constant due to the pitch being broader than the spring middle portion 33 in order to make the rigidity of the spring end portion 34 higher than that of the spring middle portion 33. To describe this in detail, in the first coil spring 32a, the pitch at the spring end portion 34a-2 is wider than that at the spring middle portion 33a, as illustrated in FIG. 8 (P2>P1 in FIG. 8). It is needless to describe that in a coil spring, broadening the pitch of the coiled wire (wire) and reducing the number of coils raises the spring constant. Thus, according to this configuration, the rigidity of the spring end portion 34a-2 is higher than that of the spring middle portion 33a in the first coil spring 32a.

In the second coil spring 32*b*, the pitch at the spring end portion 34*b*-1 is wider than that at the spring middle portion 33*b*. According to this configuration, the rigidity of the spring end portion 34*b*-1 is higher than that of the spring middle portion 33*b* in the second coil spring 32*b*.

Also, according to this configuration (third arrangement), the spring end portion 34*a*-2 and the spring end portion 34*b*-1 can also exhibit elastic compression deformation. Accordingly, the effective length of the first spring body 31 is longer, and the movement stroke of the nut 19 can be made to be larger.

Regarding Ball Screw Device 17 According to Present Disclosure

As described above, the ball screw device 17 according to the present disclosure (see FIG. 5) is provided with the screw shaft 18, the nut 19, the balls 20 provided between the first helical groove 29 of the screw shaft 18 and the second helical groove 30 of the nut 19, the first stopper 26 provided at the end portion of the second helical groove 30, and the first spring body 31 disposed between the end portion ball 20*a* and the first stopper 26. The first spring body 31 is made up of the coil springs 32 (32*a*, 32*b*, 32*c*) arrayed along the first helical groove 29 and the second helical groove 30 in a row.

According to the ball screw device 17 that has the above configuration, the coil springs 32 (32*a*, 32*b*, 32*c*) are separated into a plurality and arrayed in a row between the end portion ball 20*a* and the first stopper 26. Accordingly, the first spring body 31, i.e., the coil springs 32 (32*a*, 32*b*, 32*c*), can be subjected to compression deformation between the end portion ball 20*a* and the first stopper 26 as a whole, by changing the properties (spring constants) of each of the coil springs 32 (32*a*, 32*b*, 32*c*). As a result the life of the coil springs 32 can be extended against fatigue. Further, setting the properties (spring constants) of the coil springs 32 (32*a*, 32*b*, 32*c*) to maximally uniformly exhibit compression deformation as a whole enables the movement stroke of the nut 19 to be increased even further, which will be described later.

Also, in the ball screw device 17 according to the present disclosure, adjacent coil springs 32 are in contact with each other at the spring end portions 34. The first coil spring 32*a* and the second coil spring 32*b* that are adjacent each have spring end portions 34*a*-2 and 34*b*-1 that have higher rigidity than that of the spring middle portions 33*a* and 33*b*. The second coil spring 32*b* and the third coil spring 32*c* that are adjacent each have spring end portions 34*b*-2 and 34*c*-1 that have higher rigidity than that of the spring middle portions 33*b* and 33*c*.

As described above, when the coil springs 32 (32*a*, 32*b*, 32*c*) are separated into a plurality, the spring end portions 34 come into contact with each other. When the forms of the spring end portions 34 are the same as the forms of the spring middle portions 33, i.e., when the rigidity of the spring end portions 34 is low, there is a possibility that the centers of the spring end portions 34 will become misaligned, for example, in a state where the spring end portions 34 are in contact with each other, leading to unpredictable behavior. In such a case, the functions of the ball screw device 17 will deteriorate. However, according to the ball screw device 17 of the present disclosure, the rigidity of the spring end portions 34 is high. As a result, the orientation and the behavior of the adjacent spring end portions 34 can be stabilized.

In the ball screw device 17, the nut 19 moves along the axial direction of the screw shaft 18 due to rotation of the screw shaft 18, and the balls 20 also move along the first helical groove 29 and the second helical groove 30. When the nut 19 moves over a predetermined stroke from a state of being at an initial position, the direction of movement is a direction indicated by arrow J in FIGS. 4 and 5. Movement of the end portion ball 20*a* included in the balls 20 compresses the coil springs 32*a*, 32*b*, and 32*c*. The coil springs 32*a*, 32*b*, and 32*c* that are compressed in this way are readily compressed at the end portion ball 20*a* side, but not readily compressed at the first stopper 26 side.

Accordingly, in the present disclosure, in the first spring body 31, the spring constant of the coil spring 32 (spring middle portion 33) toward the first stopper 26 side is set to be smaller than that of the coil spring 32 (spring middle portion 33) toward the end portion ball 20*a* side, as described above. According to this configuration, the coil spring 32 at the first stopper 26 side is more readily made to exhibit compression deformation than the coil spring 32 at the end portion ball 20*a* side. Accordingly, the first spring body 31 configured of the coil springs 32*a*, 32*b*, and 32*c* can be readily made to maximally uniformly exhibit compression deformation as a whole. As a result, the movement stroke of the nut 19 can be increased even further.

Also, the rigidity of the spring end portions 34 in contact with adjacent coil springs 32 is higher than that of the spring middle portions 33, and accordingly the springs are seated better at both of the adjacent spring end portions 34. That is to say, the centers of the spring end portions 34 are readily aligned, and the first spring body 31 can be made to behave as if a single coil spring 32.

The embodiment disclosed herein is exemplary in all points, and is not limiting. The scope of the disclosure is not limited to the above-described embodiment, and includes all modifications made within the scope of equivalency to the configurations set forth in the Claims.

What is claimed is:

1. A ball screw device comprising:
    a screw shaft that has a first helical groove on an outer circumference thereof;
    a nut disposed on an outer circumferential side of the screw shaft and having a second helical groove on an inner circumference thereof;
    a plurality of balls disposed between the first helical groove and the second helical groove;
    a stopper disposed at an end portion of the second helical groove; and
    a spring body disposed between the stopper and an end portion ball closest to the stopper out of the plurality of balls, the spring body including:
        a first coil spring arrayed along the first helical groove and the second helical groove, the first coil spring having:
            a first spring middle portion; and
            a first spring end portion having a higher rigidity than a rigidity of the first spring middle portion; and
        a second coil spring arrayed along the first helical groove and the second helical groove, the second coil spring being adjacent to the first coil spring, the second coil spring having:
            a second spring middle portion; and
            a second spring end portion having a higher rigidity than a rigidity of the second spring middle portion, the second spring end portion being in contact with the first spring end portion.

2. The ball screw device according to claim 1, wherein coils in the first spring end portion are in direct contact with no gap therebetween when compressed under a load at which the first spring middle portion exhibits elastic compression deformation, due to a pitch at the first spring end portion being narrower than a pitch at the first spring middle portion.

3. The ball screw device according to claim 1, wherein coils in the first spring end portion are in direct contact with no gap therebetween.

4. The ball screw device according to claim 1, wherein a spring constant of the first spring end portion is higher than a spring constant of the first spring middle portion, due to a pitch at the first spring end portion being wider than a pitch at the first spring middle portion.

5. The ball screw device according to claim 1, wherein a total dimension in a spring longitudinal direction of the first spring end portion and the second spring end portion is smaller than a coil average diameter of the first and second coil springs.

6. The ball screw device according to claim 1, wherein, the second coil spring is closer to the stopper than is the first coil spring, the first coil spring is closer to the end portion ball than is the second coil spring, and a spring constant of the second coil spring is smaller than a spring constant of the first coil spring.

* * * * *